United States Patent
Eckel et al.

(10) Patent No.: US 6,727,301 B1
(45) Date of Patent: Apr. 27, 2004

(54) FLAME-RESISTANT, IMPACT-RESISTANT MODIFIED POLYCARBONATE MOLDING AND EXTRUSION MASSES

(75) Inventors: Thomas Eckel, Dormagen (DE); Michael Zobel, Köln (DE); Dieter Wittmann, Leverkusen (DE); Torsten Derr, Dormagen (DE); Manfred Öller, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/937,470

(22) PCT Filed: Mar. 14, 2000

(86) PCT No.: PCT/EP00/02241

§ 371 (c)(1),
(2), (4) Date: Sep. 25, 2001

(87) PCT Pub. No.: WO00/58394

PCT Pub. Date: Oct. 5, 2000

(30) Foreign Application Priority Data

Mar. 27, 1999 (DE) .......................................... 199 14 139

(51) Int. Cl.$^7$ .............................................. C08K 5/523
(52) U.S. Cl. ...................................................... 524/127
(58) Field of Search ......................................... 524/127

(56) References Cited

U.S. PATENT DOCUMENTS

| | | | | |
|---|---|---|---|---|
| 5,204,394 A | | 4/1993 | Gosens et al. .............. | 363/125 |
| 5,672,645 A | * | 9/1997 | Eckel et al. ................ | 524/127 |
| 5,750,602 A | * | 5/1998 | Kohler et al. .............. | 524/127 |
| 5,864,004 A | | 1/1999 | Kim et al. .................. | 524/142 |
| RE36,188 E | | 4/1999 | Gosens et al. .............. | 363/125 |
| 5,961,915 A | | 10/1999 | Toyouchi et al. ........... | 754/572 |
| 5,994,463 A | * | 11/1999 | Eckel et al. ................ | 525/67 |
| 6,083,428 A | * | 7/2000 | Ueda et al. ................. | 252/609 |
| 6,326,423 B1 | * | 12/2001 | Eckel et al. ................ | 524/117 |
| 6,414,107 B1 | * | 7/2002 | Zobel et al. ................ | 528/196 |
| 6,441,068 B1 | * | 8/2002 | Eckel et al. ................ | 524/127 |
| 2002/0072553 A1 | * | 6/2002 | Eckel et al. ................ | 524/127 |

FOREIGN PATENT DOCUMENTS

| | | |
|---|---|---|
| DE | 197 21 628 | * 11/1998 |
| DE | 19 734 661 | 2/1999 |
| DE | 197 34 667 | * 2/1999 |
| DE | 198 01 050 | * 7/1999 |
| DE | 19 853 108 | 5/2000 |
| DE | 198 56 484 | * 6/2000 |
| EP | 0 522 397 | 1/1993 |
| EP | 0 611 798 | 8/1994 |
| EP | 0 755 977 | 1/1997 |
| EP | 0 767 204 | 4/1997 |
| EP | 0 771 851 | 5/1997 |
| EP | 0 816 434 | 1/1998 |
| EP | 0 936 243 | 8/1999 |
| EP | 0 747 424 | 8/2000 |
| FR | 2781807 | 2/2000 |
| JP | 59-202240 | 11/1984 |
| WO | 96/27600 | 9/1996 |

OTHER PUBLICATIONS

Bright et al:, "Aromatic Oligomeric Phosphates", Annu. Tech. Conf. –Soc. Plast. Eng., Bd. 56, Nr. 3, Apr. 26, 1998, XP002101625.

* cited by examiner

Primary Examiner—Peter Szekely
(74) Attorney, Agent, or Firm—Joseph C. Gil; James R. Franks

(57) ABSTRACT

A graft polymer-modified thermoplastic polycarbonate molding composition is described. The thermoplastic polycarbonate molding composition comprises a phosphorous compound or a mixture of phosphorous compounds. Thermoplastic molding compositions according to the present invention are flame resistant, and have desirable mechanical properties and elevated heat resistance.

12 Claims, No Drawings

FLAME-RESISTANT, IMPACT-RESISTANT MODIFIED POLYCARBONATE MOLDING AND EXTRUSION MASSES

CROSS REFERENCE TO RELATED PATENT APPLICATIONS

The present patent application claims the right of priority under 35 U.S.C. 119 (a)–(d) and 35 U.S.C. 365 of International Application No. PCT/EP00/02241, filed Mar. 14, 2000, which was published in German as International Patent Publication No. WO 00/58394 on Oct. 5, 2000, which is entitled to the right of priority of German Patent Application No. 199 14 139.8, filed Mar. 27, 1999.

FIELD OF THE INVENTION

The present invention relates to flame resistant graft polymer-modified polycarbonate moulding compositions containing phosphate compounds, which compositions exhibit excellent flame retardancy, very good mechanical properties and elevated heat resistance.

BACKGROUND OF THE INVENTION

Diphosphates are known as flame retardant additives. JP 59 202 240 describes the production of such a product from phosphorus oxychloride, diphenols such as hydroquinone or bisphenol A and monophenols such as phenol or cresol. These diphosphates may be used as flame retardants in polyamide or polycarbonate. However, this document makes no reference to improved heat resistance due to the addition of the oligomeric phosphate to polycarbonate moulding compositions.

EP-A 0 363 608 describes flame resistant polymer blends prepared from aromatic polycarbonate, copolymer or graft copolymer containing styrene together with oligomeric phosphates as flame retardant.

EP-A 0 767 204 describes flame resistant polyphenylene oxide (PPO) or polycarbonate mixtures which contain a mixture of oligophosphates (of the bisphenol A (BPA) oligophosphate type) and monophosphates as the flame retardant. Elevated flame retardant contents give rise to disadvantageous mechanical properties and reduced heat resistance.

EP-A 0 611 798 and WO 96/27600 describe moulding compositions which, in addition to polycarbonate, contain oligomeric, terminally alkylated phosphoric acid esters of the BPA type. Due to the alkylation, elevated contents are required in order to achieve effective flame retardancy, which is highly disadvantageous for many applicational properties (mechanical properties, heat resistance).

EP-A 0 754 531 describes reinforced PC/ABS moulding compositions which are suitable for precision components. Flame retardants which are used also include inter alia BPA type oligophosphates. The elevated filler contents have a highly disadvantageous effect on mechanical properties.

EP-A 771 851 describes moulding compositions which contain aromatic polycarbonate, graft polymer based on diene rubber/SAN copolymer, a phosphate and tetrafluoroethylene polymers, wherein the polycarbonate has differing molecular weights. Resistance to loss of impact strength, to heat and moisture is stated as the advantage.

EP-A 755 977 describes polymer blends prepared from aromatic polycarbonate, graft copolymer having a rubber content of <25% as well as oligomeric phosphates having an added content of <8% and an N value of N=1–35 as flame retardant additives. This document makes no reference to processability at elevated filler contents nor to weld line strength. Disadvantages with regard to flame retardancy may also be expected due to the limitation of the content of phosphates.

EP-A 747 424 describes thermoplastic resins which contain phosphate compounds having a molecular weight of approx. 500 to 2000 and of phosphate compounds having a molecular weight of approx. 2300 to 11000 as the flame retardant, wherein numerous thermoplastic resins are listed. The elevated molecular weights of the phosphorus compounds distinctly impairs flow behaviour of the moulding compositions.

SUMMARY OF THE INVENTION

The object of the present invention is to provide flame retardant, graft polymer-modified PC moulding compositions, which are distinguished by very good mechanical properties, elevated heat resistance and a low burn time in fire behaviour, as a result of which these moulding compositions are suitable for the production of housing components of a complicated geometry.

It has now been found that graft polymer-modified polycarbonate moulding compositions which contain phosphorus compounds having a selected number of repeat units have the desired range of properties.

The present invention accordingly provides graft polymer-modified polycarbonate moulding compositions containing phosphorus compounds of the formula (I)

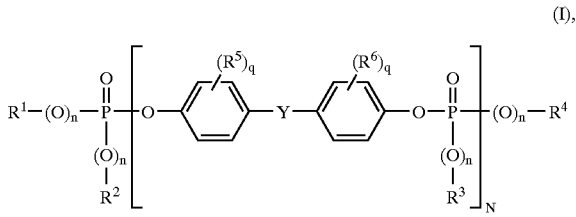

in which
R$^1$, R$^2$, R$^3$ and R$^4$ are mutually independently C$_1$–C$_8$ alkyl, optionally substituted by halogen, C$_5$–C$_6$ cycloalkyl, C$_6$–C$_{10}$ aryl or C$_7$–C$_{12}$ aralkyl, each optionally substituted by halogen and/or alkyl, n are mutually independently 0 or 1, q are mutually independently 0, 1, 2, 3 or 4, N is 0.6 to 4, preferably 0.9 to 2.5, in particular 1 to 1.15, R$^5$ and R$^6$ mutually independently mean C$_1$–C$_4$ alkyl, preferably methyl, or halogen, preferably chlorine and/or bromine, Y means C$_1$–C$_7$ alkylidene, C$_1$–C$_7$ alkylene, C$_5$–C$_{12}$ cyoalkylene, C$_5$–C$_{12}$ cycloalkylidene, —O—, —S—, —SO—, —SO$_2$— or —CO—.

DETAILED DESCRIPTION OF THE INVENTION

The thermoplastic moulding compositions preferably contain 0.5 to 20, particularly preferably 1 to 18 and in particular 2 to 16 parts by weight of phosphorus compound (I) or a mixture of phosphorus compounds (I).

Preferred thermoplastic moulding compositions are those containing

A) 40 to 99, preferably 60 to 98.5 parts by weight of aromatic polycarbonate and/or polyester carbonate B) 0.5 to 60, preferably 1 to 40, in particular 2 to 25 parts by weight of graft polymer of B.1) 5 to 95, preferably 30 to 80 wt. % of one or more vinyl monomers on B.2) 95 to 5, preferably 20 to 70 wt. % of one or more grafting backbones having a glass transition temperature of <10° C., preferably of <0° C., particularly preferably of <−20° C., C) 0 to 45, preferably 0 to 30, particularly preferably 2 to 25 parts by weight of at least one thermoplastic polymer selected from the group comprising vinyl (co) polymers and polyalkylene terephthalates, D) 0.5 to 20 parts by weight, preferably 1 to 18 parts by weight, particularly preferably 2 to 16 parts by weight of a phosphorus compound of the formula (I)

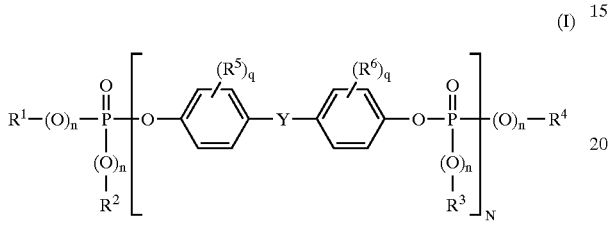

(I)

in which $R^1$ to $R^6$, Y, n, N and q have the above-stated meaning,

E) 0 to 3, preferably 0.05 to 2, particularly preferably 0.1 to 0.8 parts by weight of fluorinated polyolefin.

Component A

Component A aromatic polycarbonates and/or aromatic polyester carbonates which are suitable according to the invention are known from the literature or may be produced using processes known from the literature (c.f. in relation to the production of aromatic polycarbonates, for example Schnell, *Chemistry & Physics of Polycarbonates*, Interscience Publishers, 1964 and DE-AS 1 495 626, DE-OS 2 232 877, DE-OS 2 703 376, DE-OS 2 714 544, DE-OS 3 000 610, DE-OS 3 832 396; in relation to the production of polyester carbonates for example DE-OS 3 077 934).

Aromatic polycarbonates are produced for example by reacting diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using trifunctional or greater than trifunctional branching agents, for example triphenols or tetraphenols.

Diphenols for the production of the aromatic polycarbonates and/or aromatic polyester carbonates are preferably those of the formula (III)

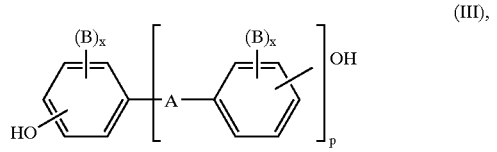

(III), wherein

A means a single bond, $C_1$–$C_5$ alkylene, $C_2$–$C_5$ alkylidene, $C_5$–$C_6$ cycloalkylidene, —O—, —SO—, —CO—, —S—, —SO$_2$—, $C_6$–$C_{12}$ arylene, onto which further aromatic rings optionally containing heteroatoms may be fused, or a residue of the formula (IV) or (V)

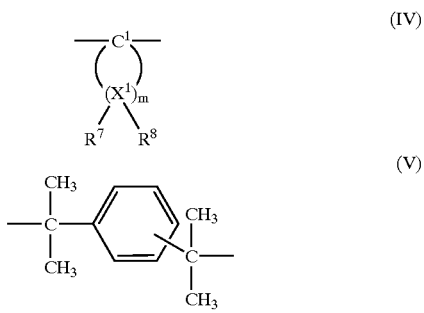

B in each case is $C_1$–$C_{12}$ alkyl, preferably methyl, halogen, preferably chlorine and/or bromine x in each case mutually independently is 0, 1 or 2, p is 1 or 0 and $R^7$ and $R^8$ mutually independently, individually selectably for each $X^1$, mean hydrogen or $C_1$–$C_6$ alkyl, preferably hydrogen, methyl or ethyl, $X^1$ means carbon and m means an integer from 4 to 7, preferably 4 or 5, providing that $R^7$ and $R^8$ are simultaneously alkyl on at least one atom $X^1$.

Preferred diphenols are hydroquinone, resorcinol, dihydroxydiphenols, bis-(hydroxyphenyl)-$C_1$–$C_5$-alkanes, bis-(hydroxyphenyl)-$C_1$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)diisopropyl-benzenes together with the ring-brominated and/or ring-chlorinated derivatives thereof.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)cyclohexane, 1,1-bis-(4-hydroxyphenyl)-3,3,5-trimethylcyclohexane, 4,4'-dihydroxydiphenyl sulfide, 4,4'-dihydroxydiphenyl sulfone together with the di- and tetrabrominated or chlorinated derivatives thereof, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxy-phenyl)propane.

2,2-Bis-(4-hydroxyphenyl)propane (bisphenol A) is particularly preferred.

The diphenols may be used individually or as any desired mixtures.

The diphenols are known from the literature or are obtainable using processes known from the literature.

Chain terminators suitable for the production of the thermoplastic, aromatic polycarbonates are, for example, phenol, p-chlorophenol, p-tert.-butylphenol or 2,4,6-tribromophenol, as well as long-chain alkylphenols, such as 4-(1,3-tetramethylbutyl)phenol according to DE-OS 2 842 005 or monoalkylphenol or dialkylphenols having a total of 8 to 20 C atoms in the alkyl substituents, such as 3,5-di-tert.-butylphenol, p-iso-octylphenol, p-tert.-octylphenol, p-dodecylphenol and 2-(3,5-dimethylheptyl)phenol and 4-(3,5-dimethylheptyl)phenol. The quantity of chain terminators to be used is generally between 0.5 mol % and 10 mol %, relative to the sum of moles of the diphenols used in each case.

The thermoplastic, aromatic polycarbonates have weight average molecular weights ($\overline{M}_w$, measured for example by ultracentrifugation or light scattering) of 10000 to 200000, preferably of 20000 to 80000.

The thermoplastic, aromatic polycarbonates may be branched in a known manner, preferably by incorporating 0.05 to 2.0 mol %, relative to the sum of diphenols used, of trifunctional or greater than trifunctional compounds, for example those having three and more than three phenolic groups.

Both homopolycarbonates and copolycarbonates are suitable. Component A) copolycarbonates according to the invention may be produced by also using 1 to 25 wt. %, preferably 2.5 to 25 wt. % (relative to the total quantity of diphenols to be used) of polydiorganosiloxanes having hydroxy-aryloxy end groups. These are known (c.f. for example U.S. Pat. No. 3,419,634) or may be produced using processes known from the literature. The production of copolycarbonates containing polydiorganosiloxanes is described, for example, in DE-OS 3 334 782.

Preferred polycarbonates, apart from bisphenol A homopolycarbonates, are copoly-carbonates of bisphenol A with up to 15 mol %, relative to the sum of moles of diphenols, of other diphenols mentioned as preferred or particularly preferred, in particular 2,2-bis-(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether 4,4'-dicarboxylic acid and 2,6-naphthalenedicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally used as a difunctional acid derivative in the production of polyester carbonates.

Chain terminators which may be considered for the production of the aromatic polyester carbonates are, apart from the above-mentioned monophenols, also the chlorocarbonic acid esters thereof and the acid chlorides of aromatic monocarboxylic acids, which may optionally be substituted by $C_1$–$C_{22}$ alkyl groups or by halogen atoms, together with aliphatic $C_2$–$C_{22}$ monocarboxylic acid chlorides.

The quantity of chain terminators is in each case 0.1 to 10 mol %, relative, in the case of phenolic chain terminators, to the number of moles of diphenols and, in the case of monocarboxylic acid chloride chain terminators, to the number of moles of dicarboxylic acid dichlorides.

The aromatic polyester carbonates may also contain incorporated aromatic hydroxycarboxylic acids.

The aromatic polyester carbonates may be both linear and branched in a known manner (c.f. in this connection also DE-OS 2 940 024 and DE-OS 3 007 934).

Branching agents which may be used are, for example, tri- or polyfunctional carboxylic acid chlorides, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in quantities of 0.01 to 1.0 mol % (relative to dicarboxylic acid dichlorides used) or tri- or polyfunctional phenols, such as phloroglucinol, 4,6-dimethyl-2,4,6-tri-(4-hydroxyphenyl)-2-heptene, 4,6dimethyl-2,4,6-tri-(4-hydroxyphenyl)heptane, 1,3,5-tri-(4-hydroxyphenyl)benzene, 1,1,1-tri-(4-hydroxyphenyl) ethane, tri-(4-hydroxyphenyl)phenylmethane, 2,2-bis-[4,4-bis-(4-hydroxyphenyl)cyclohexyl]propane, 2,4-bis(4-hydroxyphenylisopropyl)phenol, tetra-(4-hydroxyphenyl) methane, 2,6-bis-(2-hydroxy-5-methylbenzyl)-4-methylphenol, 2-(4hydroxyphenyl)-2-(2,4-dihydroxyphenyl)propane, tetra-(4-[4-hydroxyphenylisopropyl] phenoxy)methane, 1,4-bis[4,4'-dihydroxytriphenyl)methyl] benzene, in quantities of 0.01 to 1.0 mol %, relative to diphenols used. Phenolic branching agents may be introduced initially with the diphenols, acid chloride branching agents may be introduced together with the acid dichlorides.

The proportion of carbonate structural units in the thermoplastic, aromatic polyester carbonates may be varied at will. The proportion of carbonate groups is preferably up to 100 mol %, in particular up to 80 mol %, particularly preferably up to 50 mol %, relative to the sum of ester groups and carbonate groups. Both the ester and carbonate fractions of the aromatic polyester carbonates may be present in the form of blocks or randomly distributed in the polycondensation product.

The relative solution viscosity ($\eta_{rel}$) of the aromatic polycarbonates and polyester carbonates is in the range from 1.18 to 1.4, preferably from 1.22 to 1.3 (measured on solutions of 0.5 g of polycarbonate or polyester carbonate in 100 ml of methylene chloride solution at 25° C.).

The thermoplastic, aromatic polycarbonates and polyester carbonates may be used alone or as any desired mixture with each other.

Component B

Component B comprises one or more gaft polymers of

B.1 5 to 95, preferably 30 to 80 wt. %, of at least one vinyl monomer on

B.2 95 to 5, preferably 70 to 20 wt. %, of one or more grafting backbones having glass transition temperatures of <10° C., preferably of <0° C., particularly preferably of <–20° C.

The grafting backbone B.2 generally has an average particle size ($d_{50}$, value) of 0.05 to 5 µm, preferably of 0.10 to 0.6 µm, particularly preferably of 0.1 to 0.5 µm, very particularly preferably of 0.20 to 0.40 µm.

Monomers B.1 are preferably mixtures of

B1.1 50 to 99 parts by weight of vinyl aromatics and/or ring-substituted vinyl aromatics (such as for example styrene, α-methylstyrene, p-methylstyrene, p-chlorostyrene) and/or (meth)acrylic acid ($C_1$–$C_8$)-alkyl esters (such as for example methyl methacrylate, ethyl methacrylate) and B.1.2 1 to 50 parts by weight of vinyl cyanides (unsaturated nitriles such as acrylonitrile and methacrylonitrile) and/or (meth)acrylic acid ($C_1$–$C_8$)-alkyl esters (such as for example methyl methacrylate, n-butyl acrylate, t.-butyl acrylate) and/or derivatives (such as anhydrides and imides) of unsaturated carboxylic acids (for example maleic anhydride and N-phenylmaleimide).

Preferred monomers B.1.1 are selected from among at least one of the monomers styrene, α-methylstyrene and methyl methacrylate, preferred monomers B.1.2 are selected from among at least one of the monomers acrylonitrile, maleic anhydride and methyl methacrylate.

Particularly preferred monomers are B.1.1 styrene and B.1.2 acrylonitrile.

Grafting backbones B.2 suitable for the graft polymers B are for example diene rubbers, EP(D)M rubbers, i.e. those based on ethylene/propylene, and optionally diene, acrylate, polyurethane, silicone, chloroprene and ethylene/vinyl acetate rubbers.

Preferred grafting backbones B.2 are diene rubbers (for example based on butadiene, isoprene etc.) or mixtures of diene rubbers or copolymers of diene rubbers or mixtures thereof with further copolymerisable monomers (for example according to B.1.1. and B.1.2), providing that the glass transition temperature of component B.2 is <10° C., preferably <0° C., particularly preferably <–10° C.

Pure polybutadiene rubber is particularly preferred.

Particularly preferred polymers B are, for example, ABS polymers (emulsion, bulk and suspension ABS), as are described for example in DE-OS 2 035 390 (=U.S. Pat. No. 3,644,574) or in DE-OS 2 248 242 (=GB patent 1 409 275) or in Ullmann, *Enzyklopddie der Technischen Chemie*, volume 19 (1980), pp. 280 et seq. The gel content of the grafting backbone B.2 is at least 30 wt. %, preferably at least 40 wt. % (measured in toluene).

The graft copolymers B are produced by free-radical polymerisation, for example by emulsion, suspension, solution or bulk polymerisation, preferably by emulsion polymerisation or bulk polymerisation.

Particularly suitable graft rubbers are also ABS polymers which are produced by redox initiation using an initiator system comprising organic hydroperoxide, cumene hydroperoxide or t.-butyl hydroperoxide and ascorbic acid according to U.S. Pat. No. 4,937,285.

Since, as is known, the graft monomers are not necessarily grafted in their entirety onto the grafting backbone during the grafting reaction, graft polymers B are also taken according to the invention to include those products which are obtained by (co)polymerisation of the graft monomers in the presence of the grafting backbone and are also isolated during working up.

Suitable polymer B acrylate rubbers B.2 are preferably polymers prepared from acrylic acid alkyl esters, optionally with up to 40 wt. %, relative to B.2, of other polymerisable, ethylenically unsaturated monomers. Preferred polymerisable acrylic acid esters include $C_1$–$C_8$ alkyl esters, for example methyl, ethyl, butyl, n-octyl and 2-ethylhexyl esters; haloalkyl esters, preferably halo-$C_1$–$C_8$-alkyl esters, such as chloroethyl acrylate and mixtures of these monomers.

Monomers having more than one polymerisable double bond may also be copolymerized for crosslinking purposes. Preferred examples of crosslinking monomers are esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as for example ethylene glycol dimethacrylate, allyl methacrylate; polyunsaturated heterocyclic compounds, such as for example trivinyl and triallyl cyanurate; polyfunctional vinyl compounds, such as di- and trivinylbenzenes; as well as triallyl phosphate and diallyl phthalate.

Preferred crosslinking monomers are allyl methacrylate, ethylene glycol dimethacrylate, diallyl phthalate and heterocyclic compounds having at least three ethylenically unsaturated groups.

Particularly preferred crosslinking monomers are the cyclic monomers triallyl cyanurate, triallyl isocyanurate, triacryloylhexahydro-s-triazine, triallylbenzenes. The quantity of crosslinking monomers is preferably 0.02 to 5, preferably 0.05 to 2 wt. %, relative to the grafting backbone B.2.

It is advantageous to limit the quantity of cyclic crosslinking monomers having at least three ethylenically unsaturated groups to below 1 wt. % of the grafting backbone B.2.

Preferred "other" polymerisable, ethylenically unsaturated monomers which, in addition to the acrylic acid esters, may optionally be used to produce the grafting backbone B.2 are, for example, acrylonitrile, styrene, α-methylstyrene, acrylamides, vinyl $C_1$–$C_6$-alkyl ethers, methyl methacrylate, butadiene. Preferred acrylate rubbers as the grafting backbone B.2 are emulsion polymers having a gel content of at least 60 wt. %.

Further suitable grafting backbones B.2 are silicone rubbers having active grafting sites, as are described in DE-OS 3 704 657, DE-OS 3 704 655, DE-OS 3 631 540 and DE-OS 3 631 539.

The gel content of the grafting backbone B.2 is determined in a suitable solvent at 25° C. (M. Hoffmann, H. Krömer, R. Kuhn, *Polymeranalytik I & II*, Georg Thieme Verlag, Stuttgart 1977).

The average particle size $d_{50}$ is the diameter both above and below which 50 wt. % of the particles lie. This value may be measured by ultracentrifugation (W. Scholtan, H. Lange, *Kolloid Z. und Z. Polymere*, 250 (1972), 782–1796).

Component C

Component C comprises one or more thermoplastic vinyl (co)polymers C.1. and/or polyalkylene terephthalates C.2.

Suitable vinyl (co)polymers C.1 are polymers of at least one monomer from the group of vinyl aromatics, vinyl cyanides (unsaturated nitrites), (meth)acrylic acid ($C_1$–$C_8$)-alkyl esters, unsaturated carboxylic acids as well as derivatives (such as anhydrides and imides) of unsaturated carboxylic acids. Particularly suitable (co)polymers are those prepared from C.1.1 50 to 99, preferably 60 to 80 parts by weight of vinyl aromatics and/or ring-substituted vinyl aromatics (such as for example styrene, α-methylstyrene, p-methylstyrene, p-chlorostyrene) and/or (meth)acrylic acid ($C_1$–$C_8$)-alkyl esters (such as for example methyl methacrylate, ethyl methacrylate) and C.1.2 1 to 50, preferably 20 to 40 parts by weight of vinyl cyanides (unsaturated nitriles) such as acrylonitrile and methacrylonitrile and/or (meth)acrylic acid ($C_1$–$C_8$)-alkyl esters (such as for example methyl methacrylate, n-butyl acrylate, t.-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resinous, thermoplastic and rubber-free.

The copolymer of C.1.1 styrene and C.1.2 acrylonitrile is particularly preferred.

The (co)polymers C.1 are known and may be produced by free-radical polymerisation, in particular by emulsion, suspension, solution or bulk polymerisation. The (co)polymers preferably have molecular weights $\overline{M}_w$ (weight average, determined by light scattering or sedimentation) of between 15000 and 200000.

The component C.2 polyalkylene terephthalates are reaction products of aromatic dicarboxylic acids or the reactive derivatives thereof, such as dimethyl esters or anhydrides, and aliphatic, cycloaliphatic or araliphatic diols, together with mixtures of these reaction products.

Preferred polyalkylene terephthalates contain at least 80 wt. %, preferably at least 90 wt. %, relative to the dicarboxylic acid component, of terephthalic acid residues and at least 80 wt. %, preferably at least 90 mol %, relative to the diol component, of ethylene glycol and/or 1,4-butanediol residues.

In addition to terephthalic acid residues, the preferred polyalkylene terephthalates may contain up to 20 mol %, preferably up to 10 mol %, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, 2,6-naphthalenedicarboxylic acid, 4,4'-diphenyldicarboxylic acid, succinic acid, adipic acid, sebacic acid, azelaic acid, cyclohexanediacetic acid.

In addition to ethylene glycol or 1,4-butanediol residues, the preferred polyalkylene terephthalates may contain up to 20 mol %, preferably up to 10 mol %, of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy) benzene, 2,2-bis-(4-hydroxycyclohexyl)propane, 2,4-dihydroxy-1,1,3,3-tetramethylcyclobutane, 2,2-bis-(4-β-phydroxyethoxyphenyl)propane and 2,2-bis-(4-hydroxypropoxyphenyl)propane (DE-OS 2 407 674,2 407 776, 2 715 932).

The polyalkylene terephthalates may be branched by incorporating relatively small quantifies of tri- or tetrahydric alcohols or tri- or tetrabasic carboxylic acids, for example according to DE-OS 1 900 270 and U.S. Pat. No. 3,692,744. Examples of further preferred branching agents are trimesic acid, trimellitic acid, trimethylolethane and trimethylolpropane and pentaerythritol.

Particularly preferred polyalkylene terephthalates are those solely produced from terephthalic acid and the reactive derivatives thereof (for example the dialkyl esters thereof) and ethylene glycol and/or 1,4-butanediol, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The preferably used polyalkylene terephthalates generally have an intrinsic viscosity of 0.4 to 1.5 dl/g, preferably of 0.5 to 1.2 dl/g, measured in phenol/o-dichlorobenzene (1:1 parts by weight) at 25° C. in a Ubbelohde viscosimeter.

The polyalkylene terephthalates may be produced using known methods (c.f. for example *Kunststoff-Handbuch*, volume VIII, pp. 695 er seq., Carl Hanser Verlag, Munich 1973).

Component D

The moulding compositions according to the invention contain phosphorus compounds according to formula (I) as flame retardants,

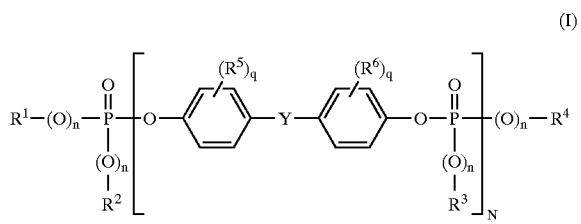

(I)

in which the residues have the above-stated meanings.

The component D phosphorus compounds which are suitable according to the invention are generally known (c.f. for example Ullmanns *Encyklopädie der technischen Chemie*, volume 18, pp. 301 et seq., 1979; Houben-Weyl, *Methoden der organischen Chemie*, volume 12/1, page 43; Beilstein, volume 6, page 177).

Preferred substituents $R^1$ to $R^4$ comprise methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl. Methyl, ethyl, butyl, phenyl and naphthyl are particularly preferred.

The aromatic groups $R^1$, $R^2$, $R^3$ and $R^4$ may be substituted with halogen and/or $C_1$–$C_4$ alkyl. Particularly preferred aryl residues are cresyl, phenyl, xylenyl, propylphenyl or butylphenyl as well as the brominated and chlorinated derivatives thereof.

$R^5$ and $R^6$ mutually independently preferably mean methyl or bromine.

Y preferably denotes $C_1$–$C_7$ alkylene, in particular isopropylidene or methylene, most particularly preferably isopropylidene.

n in the formula (I) may mutually independently be 0 or 1, n preferably equals 1.

q may be 0, 1, 2, 3 or 4, q is preferably 0, 1 or 2.

N may assume values of 0.5 to 4, preferably of 0.9 to 2.5, in particular of 1 to 1.15. Mixtures of various phosphates may also be used as component D according to the invention. In this case, N has an average value. Monophosphorus compounds (N=0) may also be present in this mixture.

The average N values may be determined by using suitable methods (gas chromatography (GC), high pressure liquid chromatography (HPLC), gel permeation chromatography (GPC)) to determine the composition of the phosphate mixture (molecular weight distribution) and calculating therefrom the average values for N.

Component E

Fluorinated polyolefins may be added as a further component.

The fluorinated polyolefins E are of a high molecular weight and have glass transition temperatures of above −30° C., generally of above 100° C., fluorine contents preferably of 65 to 76, in particular of 70 to 76 wt. %, average particle diameters $d_{50}$ of 0.05 to 1000, preferably of 0.08 to 20 μm. The fluorinated polyolefins E generally have a density of 1.2 to 2.3 g/cm$^3$. Preferred fluorinated polyolefins E are polytetrafluoroethylene, polyvinylidene fluoride, tetrafluoroethylene/hexafluoropropylene and ethylene/tetrafluoroethylene copolymers. The fluorinated polyolefins are known (c.f. *Vinyl & Related Polymers* by Schildknecht, John Wiley & Sons Inc., New York, 1962, pp. 484–494; *Fluoropolymers* by Wall, Wiley-Interscience, John Wiley & Sons Inc., New York, volume 13, 1970, pp. 623–654; *Modern Plastics Encyclopedia,* 1970–1971, volume 47, no. 10 A, October 1970, McGraw-Hill Inc., New York, pp. 134 and 774; *Modern Plastics Encyclopedia,* 1975–1976, October 1975, volume 52, no. 10A, McGraw-Hill Inc., New York, pp. 27, 28 and 472 and U.S. Pat. Nos. 3,671,487, 3,723,373 and 3,838,092).

They may be produced using known processes, thus for example by polymerising tetrafluoroethylene in an aqueous medium with a free-radical forming catalyst, for example sodium, potassium or ammonium peroxydisulfate, at pressures of 7 to 71 kg/cm$^2$ and at temperatures of 0 to 200° C., preferably at temperatures of 20 to 100° C. (c.f. for example U.S. Pat. No. 2,393,967 for further details). Depending upon the form in which they are used, the density of these materials may be between 1.2 and 2.3 g/cm$^3$, the average particle size between 0.5 and 1000 μm.

Polyolefins E preferred according to the invention are tetrafluoroethylene polymers having average particle diameters of 0.05 to 20 μm, preferably of 0.08 to 10 μm, and a density of 1.2 to 1.9 g/cm$^3$, and are preferably used in the form of a coagulated mixture of emulsions of the tetrafluoroethylene polymers E with emulsions of the graft polymers B. Suitable tetrafluoroethylene polymer emulsions are conventional commercial products and are offered for sale, for example, by DuPont as Teflon™ 30N.

Suitable fluorinated polyolefins E usable in powder form are tetrafluoroethylene polymers having average particle diameters of 100 to 1000 μm and densities of 2.0 g/cm$^3$ to 2.3 g/cm³ and are offered for sale by the companies DuPont as Teflon and Dyneon GmbH (Burgkirchen, Germany) under the commercial name Hostaflon® PTFE.

The moulding compositions according to the invention may contain at least one of the conventional additives, such as lubricants and mould release agents, for example pentaerythritol tetrastearate, nucleating agents, anti-static agents, stabilisers, fillers and reinforcing materials as well as dyes and pigments.

The filled or reinforced moulding compositions may contain up to 60, preferably 10 to 40 wt. %, relative to the filled or reinforced moulding composition, of fillers and/or reinforcing materials. Preferred reinforcing materials are glass fibres. Preferred fillers, which may also have a reinforcing action, are glass beads, mica, silicates, quartz, talcum, titanium dioxide, wollastonite.

The moulding compositions according to the invention may contain up to 35 wt. %, relative to the overall moulding composition, of a further, optionally synergistic flame retardant. Examples of further flame retardants which may be mentioned are organic halogen compounds, such as decabromobisphenyl ether, tetrabromobisphenol, inorganic halogen compounds such as ammonium bromide, nitrogen compounds, such as melamine, melamine/formaldehyde resins, inorganic hydroxide compounds, such as Mg, Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate, talcum, silicate, silicon oxide and tin oxide, as well as siloxane compounds. Monophosphate compounds, oligomeric phosphate compounds or mixtures thereof may additionally be used as flame retardants. Such phosphorus compounds are described in EP-A 363 608, EP-A 345 522 and DE-OS 197 21 628.

The moulding compositions according to the invention containing components A to E and optionally further known additives such as stabilisers, dyes, pigments, lubricants and mould release agents, nucleating agents, as well as antistatic agents, fillers and reinforcing materials are produced by mixing the particular constituents in a known manner and melt-compounding and melt-extruding them at temperatures of 200° C. to 300° C. in conventional units such as internal kneaders, extruders and twin-screw extruders, wherein component E is preferably used in the form of the above-mentioned coagulated mixture.

The individual constituents may be mixed in a known manner both in succession and simultaneously and both at approx. 20° C. (room temperature) and at a higher temperature.

The present invention accordingly also provides a process for the production of the moulding compositions.

By virtue of their excellent flame retardancy, in particular short burn time, and good mechanical properties and elevated heat resistance, the thermoplastic moulding compositions according to the invention are suitable for the production of mouldings of any kind, in particular those subject to stringent requirements with regard to mechanical properties.

The moulding compositions of the present invention may be used for the production of mouldings of any kind. Mouldings may in particular be produced by injection moulding. Examples of mouldings which may be produced are: casings of all kinds, for example for domestic appliances such as juice extractors, coffee machines, food mixers, for office equipment, such as monitors, printers, copiers or cladding sheet for the building sector and automotive components. They may also be used in electrical engineering applications as they have very good electrical properties.

The moulding compositions according to the invention may furthermore, for example, be used to produce the following mouldings or shaped articles:

1. Interior trim for rail vehicles
2. Hub-caps
3. Casings for electrical devices containing small transformers
4. Casings for information dissemination and transmission devices
5. Casings and cladding for medical purposes
6. Massage devices and casings therefor
7. Toy vehicles for children
8. Sheet wall elements
9. Casings for safety equipment
10. Hatchback spoilers
11. Thermally insulated transport containers
12. Apparatus for keeping or caring for small animals
13. Mouldings for sanitary and bathroom installations
14. Cover grilles for ventilation openings
15. Mouldings for summer houses and sheds
16. Casings for garden appliances.

Another processing method is the production of mouldings by thermoforming of previously produced sheet or film.

The present invention accordingly also provides the use of the moulding compositions according to the invention for the production of mouldings of all kinds, preferably those stated above, and the mouldings made from the moulding compositions according to the invention.

EXAMPLES

Component A

Bisphenol A based polycarbonate having a relative solution viscosity of 1.255, measured in methylene chloride at 25° C. and a concentration of 0.5 g/100 ml.

Component B

Graft polymer of 40 parts by weight of styrene and acrylonitrile in a 73:27 ratio on 60 parts by weight of particulate crosslinked polybutadiene rubber (average particle diameter $d_{50}$=0.28 μm), produced by emulsion polymerisation using a redox initiator prepared from t.-butyl hydroperoxide and ascorbic acid.

B.2: Silicone Graft Rubber

1. Production of the Silicone Rubber Emulsion 38.4 parts by weight of octamethylcyclotetrasiloxane, 1.2 parts by weight of tetramethyltetravinylcyclotetrasiloxane and 1 part by weight of mercaptopropylmethyldimethoxysilane are stirred together. 0.5 parts by weight of dodecylbenzenesulfonic acid are added, then 58.4 parts by water are added within 1 hour. Stirring is vigorous during this operation. The pre-emulsion is homogenised twice at 200 bar using a high pressure emulsifying machine. A further 0.5 parts by weight of dodecylbenzenesulfonic acid are added. The emulsion is stirred for 2 hours at 85° C. and then for 36 hours at 20° C. Neutralisation is performed with 5 n NaOH. A stable emulsion is obtained with a solids content of approx. 36 wt. %. The polymer has a gel content of 82 wt. %, measured in toluene; the average particle diameter $d_{50}$ is 300 nm.

2. Production of the Grafted Silicone Rubber

The following are initially introduced into a reactor:
2107 parts by weight of latex according to 1) and
1073 parts by weight of water.

After initiation with a solution of 7.5 parts by weight of potassium peroxy-disulfate in 195 parts by weight of water at 65° C., the following solutions are in each case uniformly apportioned within 4 hours to produce a graft rubber:

Solution 1: 540 parts by weight of styrene and 210 parts by weight of acrylonitrile;

Solution 2: 375 parts by weight of water and 15 parts by weight of $C_{14}$–$C_{18}$-alkylsulfonic acid sodium salt.

Polymerisation is then taken to completion within 6 hours at 65° C. A latex is obtained with a solids content of approx. 33 wt. %.

After coagulation with an aqueous magnesium chloride/acetic acid solution, filtration and vacuum drying, the graft polymers are obtained in the form of white powders.

B.3 Acrylate Graft Rubber

Graft polymer of 40 parts by weight of a copolymer of styrene and acrylonitrile in a ratio of 72:28 on 60 parts by weight of particulate, crosslinked polyacrylate rubber (average particle size $d_{50}$=0.5 μm) produced by emulsion polymerisation.

B.4: EPDM Graft Rubber

Graft polymer of 50 parts by weight of a copolymer of styrene and acrylonitrile in a ratio of 72:28 on 50 parts by weight of crosslinked EPDM rubber from Uniroyal Chemical Company, trade name Royaltuf 372 P20.

Component C

Styrene/acrylonitrile copolymer having a styrene:acrylonitrile ratio of 72:28 and an intrinsic viscosity of 0.55 dl/g (measured in dimethylformamide at 20° C.).

Component D

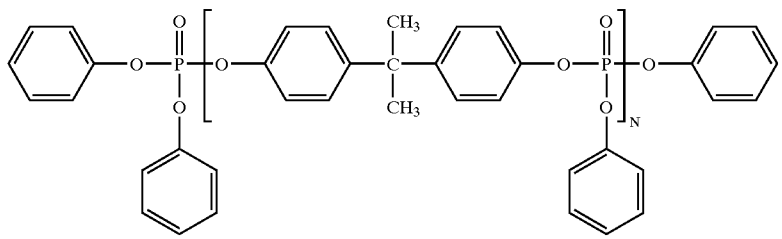

D.1 N=0.5

D.2 N=0.8

D.3 N=1.06

D.4 N =1.10

D.5 N =1.13

D.6 N=1.7

The average N value was determined by firstly determining the proportions of the monomeric and oligomeric phosphates by HPLC measurements:

Column type: LiChrosorp RP-8

Eluent in the gradient:

Acetonitrile:water 50:50 to 100:0

Concentration 50 mg/ml

The number-weighted averages are then determined in known manner from the proportions of the individual constituent mono- and oligophosphates.

Component E

Teflon® 30N from DuPont, Wilmington, Del., USA.

Production and Testing of the Moulding Compositions According to the Invention

The components are mixed with conventional processing auxiliaries in a ZSK 32 twin screw extruder. The mouldings are produced at 260° C. on an Arburg model 270 E injection moulding machine.

The Vicat B softening point is determined to DIN 53 460 on bars of dimensions 80×10×4 mm.

Weld line strength is determined to DIN 53 453

Tensile strength is determined to ISO 527/DIN 53 457.

Flame retardancy is determined to UL 94V.

TABLE 1

Composition and properties of moulding compositions

| Components [parts by weight] | 1. Comp. | 2 | 3 | 4 | 5 | 6 | 7 | 8 | 9 |
|---|---|---|---|---|---|---|---|---|---|
| A | 68.4 | 68.4 | 68.4 | 68.4 | 68.4 | 68.4 | 68.4 | 68.4 | 68.4 |
| B.1 | 10.6 | 10.6 | 10.6 | 10.6 | 10.6 | 10.6 | — | — | — |
| B.2 | 10.6 | — | — | — | — | — | 10.6 | — | — |
| B.3 | 10.6 | — | — | — | — | — | — | 10.6 | — |
| B.4 | 10.6 | — | — | — | — | — | — | — | 10.6 |
| C | 9.3 | 9.3 | 9.3 | 9.3 | 9.3 | 9.3 | 9.3 | 9.3 | 9.3 |
| D.1 (comp.) | 12.0 | — | — | — | — | — | — | — | — |
| D.2 | — | 12.0 | — | — | — | — | — | — | — |
| D.3 | — | — | 12.0 | — | — | — | 12.0 | 12.0 | 12.0 |
| D.4 | — | — | — | 12.0 | — | — | | | |
| D.5 | — | — | — | — | 12.0 | — | | | |
| D.6 | — | — | — | — | — | 12.0 | | | |
| E | 0.4 | 0.4 | 0.4 | 0.4 | 0.4 | 0.4 | 0.4 | 0.4 | 0.4 |
| PETS* | 0.4 | 0.4 | 0.4 | 0.4 | 0.4 | 0.4 | 0.4 | 0.4 | 0.4 |
| Properties | | | | | | | | | |
| Vicat B 120 [° C.] | 93 | 98 | 102 | 103 | 104 | 106 | 102 | 103 | 103 |
| Tensile strength [N/mm$^2$] | 54.2 | 57.8 | 58.0 | 58.3 | 58.5 | 55.5 | 57.5 | 58.7 | 58.3 |

TABLE 1-continued

Composition and properties of moulding compositions

|  | 1. Comp. | 2 | 3 | 4 | 5 | 6 | 7 | 8 | 9 |
|---|---|---|---|---|---|---|---|---|---|
| UL 94 V 1.6 mm | | | | | | | | | |
| Total burn time [s] | 21 | 28 | 36 | 36 | 38 | 65 | 20 | 35 | 38 |
| Rating | V-0 | V-0 | V-0 | V-0 | V-0 | V-1 | V-0 | V-0 | V-0 |
| Weld line strength on [kJ/m$^2$] | 5.8 | 6.2 | 7.9 | 8.6 | 8.8 | 8.3 | 7.3 | 9.4 | 9.0 |

*PETS = pentaerythritol tetrastearate

It is evident from Table 1 that only the moulding compositions according to the invention exhibit an optimal combination of heat resistance, tensile modulus of elasticity, flow behaviour and flame retardancy. If the phosphates used as flame retardants have a lower degrees of condensation, while flow behaviour and flame retardancy are indeed more favourable, heat resistance and weld line strength do not achieve the level required for many applications.

What is claimed is:

1. A moulding composition consisting of:
   A) 40 to 99 parts by weight of at least one of aromatic polycarbonate selected from at least one member of the group consisting of bisphenol A homopolycarbonates and copolycarbonates of bisphenol A and up to 15 mol % of at least one other diphenol;
   B) 0.5 to 60 parts by weight of graft polymer prepared from the copolymerization of,
      B.1) 5 to 95 wt. % of one or more vinyl monomers, and
      B.2) 95 to 5 wt. % of one or more grafting backbones having a glass transition temperature of <10° C., said grafting backbone having an average particle size of 0.10 to 0.6 μm, and a gel content of at least 40 wt. %;
   C) 0 to 45 parts by weight of at least one thermoplastic polymer selected from vinyl (co)polymers and polyalkylene terephthalates;
   D) 0.5 to 20 parts by weight of phosphorus compound represented by formula (I), or a mixture of phosphorus compounds (I)

$$R^1-(O)_n-\underset{\underset{R^2}{|}}{\overset{\overset{O}{\|}}{P}}-O-\underset{(R^5)_q}{\bigcirc}-Y-\underset{(R^6)_q}{\bigcirc}-O-\underset{\underset{R^3}{|}}{\overset{\overset{O}{\|}}{P}}-(O)_n-R^4 \quad (I),$$

$$\text{with } (O)_n \text{ groups on each P}$$

in which
   $R^1$, $R^2$, $R^3$ and $R^4$ are mutually independently $C_1$–$C_8$ alkyl, optionally substituted by halogen, $C_5$–$C_6$ cycloalkyl, $C_6$–$C_{10}$ aryl or $C_7$–$C_{12}$ aralkyl, each optionally substituted by halogen or alkyl or both,
   n mutually independently mean 0 or 1,
   q mutually independently mean 0, 1, 2, 3 or 4,
   N means 0.9 to 2.5,
   $R^5$ and $R^6$ mutually independently mean $C_1$–$C_4$ alkyl or halogen,
   Y means $C_1$–$C_7$ alkylidene, $C_1$–$C_7$ alkylene, $C_5$–$C_{12}$ cycloalkylene, $C_5$–$C_{12}$ cycloalkylidene, —O—, —S—, —SO—, —SO$_2$— or —CO—;
   E) 0 to 3 parts by weight of fluorinated polyolefin; and
   F) at least one additive selected from the group consisting of stabilisers, pigments, mould release agents, flow auxiliaries and antistatic agents.

2. Moulding composition according to claim 1, containing 1 to 18 parts by weight of phosphorus compound (I) or a mixture of phosphorus compounds (I).

3. Moulding composition according to claim 1, containing 2 to 16 parts by weight of phosphorus compound (I) or a mixture of phosphorus compounds (I).

4. Moulding composition according to claim 1, containing 1 to 40 parts by weight of graft polymer.

5. Moulding composition according to claim 1, wherein (B.1) consists of a mixture of,
   (B.1.1) 50 to 95 parts by weight of styrene, α-methylstyrene, halo- or alkyl-ring-substituted styrene, $C_1$–$C_8$ alkyl methacrylate, $C_1$–$C_8$ alkyl acrylate or mixtures of these compounds, and
   (B.1.2) 5 to 50 parts by weight of acrylonitrile, methacrylonitrile, $C_1$–$C_8$ alkyl methacrylate, $C_1$–$C_8$ alkyl acrylate, maleic anhydride, $C_1$–$C_4$ alkyl- or phenyl-N-substituted maleimide or mixtures of these compounds.

6. Moulding compositions according to claim 1 wherein Y in the formula (I) denotes isopropylidene or methylene.

7. Moulding compositions according to claim 1 wherein grafting backbone B.2 consists of at least one of diene rubber, acrylate rubber, silicone rubber or ethylene/propylene/diene rubber.

8. A method of preparing a molded article comprising:
   (a) providing the moulding compositions of claim 1; and
   (b) injection molding said molding composition to form said molded article.

9. Mouldings prepared from the moulding compositions according to claim 1.

10. The moulding composition of claim 1 wherein N of formula (I) is 1 to 1.15.

11. The moulding composition of claim 1 wherein said other diphenol of said aromatic polycarbonate (A) is selected from the group consisting of hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones, α,α-bis-(hydroxyphenyl) diisopropylbenzenes, ring-brominated derivatives thereof and ring-chlorinated derivatives thereof.

12. Said moulding composition of claim 1 wherein the other diphenol of said aromatic polycarbonate is 2,2-bis-(3,5-dibromo-4-hydroxyphenyl)propane.

* * * * *